INVENTOR.
Harold A. Walters
BY
AGENT

United States Patent Office 3,490,971
Patented Jan. 20, 1970

3,490,971
FOAMABLE LAYER AND METHOD OF APPLYING SAME TO SUBSTRATE
Harold A. Walters, Beaverton, Mich., assignor to The Dow Chemical Company, Midland, Mich., a corporation of Delaware
Filed Sept. 3, 1965, Ser. No. 484,841
Int. Cl. B32b 5/20, 7/06, 31/06
U.S. Cl. 156—79                             6 Claims

ABSTRACT OF THE DISCLOSURE

A foamable layer and method of applying same to a substrate are described. The method includes applying heat to a cover sheet which is in adhering contact with a preformed thermoplastic layer containing foamable particles, causing foaming of the thermoplastic layer in situ and causing disengagement of the cover sheet.

---

Figure 1:
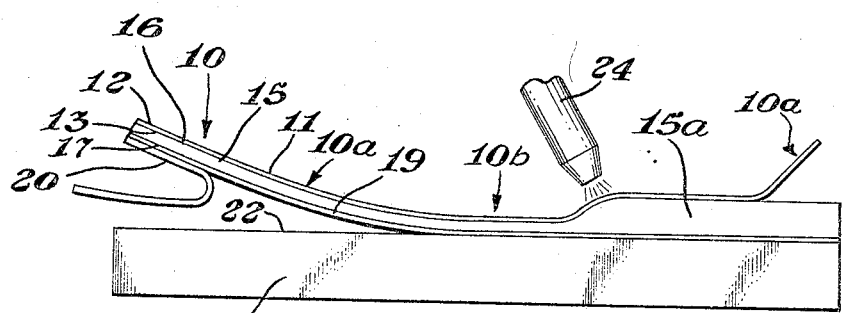

This invention relates to a foamable product and to the use thereof. It more particularly relates to a sheetlike foamable material which may be applied to a surface and to a foam coating transferred thereto.

Oftentimes for both utilitarian and decorative purposes it is desirable to provide a foamed coating on a surface, particularly a foamed coating which is relatively thin and has a smooth surface. Oftentimes it is desirable that such a coating be provided in a closely controlled configuration, that is, therein, specific areas or specific configurations. Known techniques for applying foamed coatings generally consist of preparing a thin layer of foam and adhering it to a surface in a desired configuration. Applying a liquid foamable coating to a surface, drying the coating and subsequently foaming the coating. Generally applying a liquid coating, it is difficult to obtain the desired control of the coating positioning and difficult to obtain clean, sharp angular configurations. Thin sheets of foam are extremely difficult to prepare and oftentimes do not have sufficiently small cell size to provide the necessary capacity to provide a useful coating.

It would be advantageous if there were available a means of providing a foamed coating on a surface in a precise and desired configuration. It would be further advantageous if such a coating were in an unfoamed condition when initially applied to the surface. It would be further advantageous if such a coating could remain in an unfoamed condition until such time as foaming was desired and also that the surface be protected until such time foaming is desired.

These benefits and other advantages, in accordance with the present invention, are provided by a multilayer, sheet-like body comprising a base sheet, a foamable layer, a pressure sensitive adhesive layer adhered to the foamable layer, the pressure sensitive adhesive layer being disposed on the surface of the foamable layer remote from the base sheet, a poorly adhered or peelable layer adhered to the pressure sensitive adhesive layer, the foamable layer being releasably adhered to the base sheet when the foamable layer is foamed.

The sheet of the invention is particularly adapted to be employed in the method of the invention which comprises providing a foamed layer on a surface, steps of which comprise removing the poorly adhered layer, thereby exposing the pressure sensitive adhesive layer, positioning the pressure sensitive adhesive layer in a desired location on a surface, adhering the pressure sensitive adhesive layer to the surface, applying heat to the base sheet in a sufficient quantity to cause the foamable layer to expand and delaminate from the base sheet and insufficient heat to destroy the foamable layer.

Foamable sheets, in accordance with the present invention, are readily prepared employing small expanded particles having diameters up to about a hundred microns, this preparation which is described in Belgium Patent 641,711. Such expandable thermoplastic synthetic resinous particles are readily incorporated within a thermoplastic resinous binder such as a synthetic latex at levels sufficient to adhere the unexpanded particles to a substrate of a base sheet but having insufficient binder to adhere them to a substrate when in a foamed condition. Thus, the particles of Belgium Patent 641,711, which exhibits symmetrical encapsulated subsequent expansion on heating provided an eminently suitable component for the foamable or expandable layer of the sheet, of the present invention. Suitable binders for such particles are also disclosed in Belgium Patent 641,711, as well as formulation techniques, therefore.

A wide variety of pressure sensitive adhesives are employed in the practice of the invention. Such adhesives are well known in the art and representative formulations are set forth in the following United States Patents: U.S. 2,358,761; U.S. 2,395,419; U.S. 2,744,041; U.S. 2,750,316; U.S. 2,783,166; U.S. 2,156,380; U.S. 2,177,-627; U.S. 2,319,959; and U.S. 2,553,816. Beneficially the base sheet may be prepared from any convenient impervious flexible material such as polyethylene film, polystyrene film, polypropylene film, rubber hydrochloride film, and the like. Similarly the poorly adherable sheet may be selected conveniently from any of the well known peel sheets employed to protect pressure sensitive adhesives.

In FIGURE 1 there is schematically illustrated a sheet, in accordance with the invention.

Figure 2:
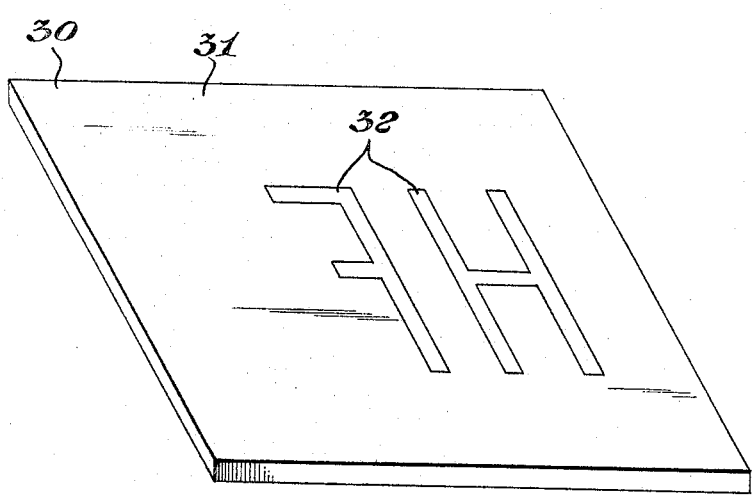

FIGURE 2 depicts a substrate such as a sheet of glass having a coating deposited thereon, in accordance with the method of the invention.

In FIGURE 1 there is illustrated a sheet, in accordance with the invention, generally designated by the reference numeral 10. The sheet 10 comprises a generally impervious base sheet 11 having a first face 12 and a second face 13. A foamable layer 15, having major face 16 and a second face 17, is adhered to the base sheet 12. A layer 19, of a pressure sensitive adhesive, is disposed over the face 17 of the foamable layer 15. A poorly adhered sheet or peel sheet 20 is adhered to the surface of layer 19 of pressure sensitive adhesive remote from the foamable layer 15. A portion of the sheet 10 generally designated as 10a is illustrated, wherein the peel strip or peel sheet 20 has been removed from the pressure sensitive adhesive 19. A further portion of the sheet 10 generally designated by the reference numeral 10b depicts a portion of the sheet adhered to a surface 22 of a substrate 23. A source of heat 24 is disposed generally adjacent a portion of the base sheet 11 causing the foamable layer 15 to expand and form the foamed layer 15a. During the process of expansion, the base sheet 11 loses adhesion to the surface 13 of the base sheet 11, which is readily stripped freely as is illustrated in the area designated by the reference numeral 10d.

In FIGURE 2 there is illustrated a substrate generally designated by the reference number 30 having a surface 31 to which is adhered a foam layer 32 disposed in a selected pattern and adhered thereto by a pressure sensitive adhesive not shown. Beneficially the substrate 30 may be transparent substrate such as glass.

EXAMPLE 1

By way of further illustration, a sheet of 51 pound base stock paper is employed as a base sheet and coated with a foamable coating comprising 150 parts by weight of a latex of a copolymer of 67 weight percent ethyl acrylate and 33 weight percent methyl methacrylate, the latex being 46 weight percent solids, the remainder being water, 1.06 parts by weight of an aqueous solution of sodium dodecyl diphenyloxide disulfonate (commercially available under the trade designation "Benax 2A1"), 50.8 parts by weight of an aqueous dispersion of expandable microspheres (having a polymer shell of 95 weight percent methyl methacrylate and 5 percent acrylonitrile) containing 36.5 percent neopentane based on the combined weight of the polymer and neopentane as a 70 percent by weight dispersion in water, and 1.72 parts by weight of a 5 percent solution in water of the sodium salt of polyacrylic acid (commercially available under the trade designation of "Acrysol GS"). The foamable coating is applied to one side of the paper base sheet to provide a dry coating having a thickness of about 3 mils. The coating is dried at a temperature of about 50° C. in a circulating air oven. A solution of a pressure sensitive adhesive is prepared by dissolving 100 parts by weight of natural crepe rubber, 100 parts by weight of zinc oxide, 60 parts by weight of hydrogenated resin together with 1.5 parts by weight of an anti-oxidant which is a condensation product of acetone and aniline in 450 parts by weight heptane. The resultant solution of the pressure sensitive adhesive is applied to the dried foamable coating supported on the paper substrate and the heptane evaporated at 50° C. in a circulating air oven to leave a coating of pressure sensitive adhesive having a thickness of about 1.5 mils. A peel strip or sheet of waxed paper (paper impregnated with paraffin wax) is placed over the exposed dried pressure sensitive adhesive layer. The resultant composite sheet is cut into decorative patterns, the waxed paper peel sheet removed and the exposed pressure sensitive adhesive of various portions is applied to such substrates as metal, wood, plastic, glass and paint. A hot air gun delivering a blast of hot air at a nominal temperature of about 400° F. is directed toward the paper base sheet (which is remote from the substrate) for a length of time sufficient to cause the expandable coating to expand and release from the paper base sheet leaving a relatively smooth foamed layer adhered to the substrate and having a configuration substantially identical to the configuration of the decorative pattern.

EXAMPLE 2

The procedure of Example 1 is repeated with the exception that the pressure sensitive adhesive employed was a solution of 100 parts by weight of polyisobutylene having a molecular weight of about 80,000, 100 parts by weight of polyisobutylene having a molecular weight of about 14,000, about 40 parts by weight of a soft cumeroneindene resin and 850 parts by weight of heptane. The resultant pressure sensitive adhesive layer has a thickness of about 2 mils and similar commensurate beneficial results, as in Example 1, are obtained.

EXAMPLE 3

The procedure of Example 1 is repeated with the exception that the pressure sensitive adhesive layer is deposited from a mixture of an aqueous latex containing a polymer of 40 weight percent styrene and 60 weight percent 2-ethylhexyl acrylate which was 46 weight percent polymer and 8 parts by weight of the sodium salt of polyacrylic acid. The latex film is dried to result in a pressure sensitive adhesive layer having a thickness of about 1 mil and commensurate beneficial results, as in Example 1, were obtained.

EXAMPLE 4

The procedure of Example 1 is repeated with the exception that the pressure sensitive adhesive is prepared from a solution of 50 parts by weight of a latex crepe rubber, 50 parts by weight of a copolymer of butadiene of 75 parts by weight butadiene and 25 parts by weight styrene having a Mooney viscosity of 90, 1 part by weight of an alkylated polyhydroxyphenol antioxidant, 50 parts by weight of a polyterpene resin having a melting point of about 70° C. and 600 parts by weight heptane. The resultant pressure sensitive adhesive layer has a thickness of about 2 mils and commensurate beneficial results, as in Example 1, are obtained.

EXAMPLE 5

The procedure of Example 1 is repeated with the exception that the pressure sensitive adhesive layer is deposited from a solution containing 80 parts by weight of polyvinyl isobutyl ether, high viscosity grade, 20 parts by weight of polyvinyl isobutyl ether, medium viscosity, 5 parts by weight of an ester gum and 420 parts by weight of heptane. The resultant pressure sensitive adhesive film has a thickness of 2.2 mils and similar advantageous and beneficial results, as in Example 1, are achieved.

EXAMPLE 6

When the procedures of Examples 1–5 are repeated employing a woven glass fabric in place of the base paper, similar beneficial advantages are obtained. When the base sheet is aluminum foil or oriented polyethylene terephthalate film such as is commercially available under the trade name of "Mylar," similar advantageous and beneficial results, as in Example 1, are obtained.

EXAMPLE 7

The procedures of Examples 1–6 are repeated employing as foamable coatings the composition of Example 1 with the exception that the composition of the foamable coating is 143.8 parts of a 60 weight percent normal butyl acrylate, 40 weight percent styrene polymer latex, 48 weight percent solids, 1.06 parts by weight "Benax 2A1," 50.8 weight percent of an aqueous dispersion of expandable microspheres having a polymer shell of 95 weight percent methyl methacrylate, 5 weight percent acrylonitrile and containing 36.5 weight percent neopentane based on the combined weight of the polymer and the neopentane and containing about 30.2 weight percent water based on the total weight of the dispersion and 1.72 parts by weight of a 5 percent aqueous solution of "Acrysol GS." Similar advantageous and beneficial results, as in Example 1, are obtained when the butyl acrylate styrene latex is replaced with 125 parts by weight of a latex of a polymer of 60 weight percent styrene and 40 weight percent butadiene, 48 weight percent solids, or by employing a latex of a copolymer of 67 weight percent styrene and 33 weight percent butadiene containing 48 percent solids, based on the total weight of the latex.

EXAMPLE 8

When the procedure of the foregoing examples is repeated employing as a foamable coating a mixture of 192 parts by weight of a latex of a polymer of 85 weight percent vinylidene chloride, 10 weight percent butylacrylate and 5 weight percent acrylonitrile containing 50 percent by weight polymer, 1.06 parts by weight of a 25 percent solids aqueous solution of sodium dodecyl diphenyl oxide disulfonate, 50.8 parts by weight of an aqueous dispersion of expandable microspheres having a shell of 95 weight percent methyl methacrylate, 5 weight percent acrylonitrile containing 36.5 weight percent neopentane based on the combined weight of the resin and neopentane and containing about 30.2 weight percent water, and 10 parts by weight of an aqueous solution containing 10 weight percent hydroxyethyl cellulose, similar beneficial and advantageous results, as in Example 1, are obtained.

In a manner similar to the foregoing examples, various foamable sheets having a pressure sensitive adhesive layer are readily prepared and such sheets are readily utilized to form foamed coatings in various desired patterns on almost any desired substrate to which a pressure sensitive adhesive will adhere.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative.

What is claimed is:
1. A laminate comprising
   a base sheet,
   a synthetic thermoplastic polymer layer in direct adhering contact with said base sheet, said polymer layer containing
   a plurality of substantially uniformly distributed thermoplastic particles containing a volatile liquid foaming agent encapsulated therein as a separate and distinct phase, said thermoplastic particles and said polymer layer softening and said particles expanding within the same temperature range, said polymer being present in sufficient quantity to adhere the unexpanded particles to said base sheet, but in insufficient quantity to adhere said particles to said base sheet when said particles are subsequently expanded,
   a pressure sensitive adhesive coating on said polymer layer remote from said base sheet and
   a peelable cover sheet adhered to said pressure sensitive coating, said polymer layer with said particles being adapted to release said base sheet upon subsequent application of heat alone to said base sheet.

2. The laminate of claim 1 wherein the base sheet is paper.

3. The laminate of claim 1 wherein the base sheet is metal foil.

4. A method for applying and adhering a synthetic thermoplastic polymer layer to a substrate surface comprising
   removing a strippable cover sheet from a pressure sensitive adhesive coating on said thermoplastic polymer layer, said polymer layer containing a plurality of substantially uniformly distributed expandable thermoplastic particles containing a liquid foaming agent as a distinct separate phase encapsulated therein, said polymer and said particles softening within the same temperature range and said particles expanding,
   pressing said pressure sensitive adhesive coating in contact with said substrate surface,
   applying heat to the exposed surface of a second cover sheet adhered directly to the surface of said thermoplastic polymer layer remote from said substrate, by the adhesive properties of said polymer layer, whereby said foaming agent causes said particles to expand and foam said polymer layer, and said heat alone causes said second cover sheet to be disengaged from said polymer layer.

5. The method of claim 4 including the step of cutting the polymer layer and adhering cover sheets and polymer layer to a desired pattern prior to adhering to the surface.

6. The method of claim 5 wherein the base sheet is heated by means of hot gas.

References Cited

UNITED STATES PATENTS

| | | | |
|---|---|---|---|
| 2,964,799 | 12/1960 | Roggi et al. | 156—79 |
| 3,123,508 | 3/1964 | Waugh | 156—247 |
| 3,128,262 | 4/1964 | Lightfoot | 264—54 |
| 3,158,529 | 11/1964 | Robitschek | 156—79 |
| 3,173,826 | 3/1965 | Campbell et al. | 161—167 |
| 3,262,827 | 7/1966 | Kallander et al. | 264—47 |
| 3,293,094 | 12/1966 | Nairn et al. | 156—79 |
| 3,341,481 | 9/1967 | Palmer | 264—54 |
| 3,411,967 | 11/1968 | Rowland et al. | 156—79 |

FOREIGN PATENTS

| | | |
|---|---|---|
| 946,365 | 1/1964 | Great Britain. |

HAROLD ANSHER, Primary Examiner

W. E. HOAG, Assistant Examiner

U.S. Cl. X.R.

156—247; 161—216, 250, 406